US012736990B2

(12) United States Patent
Hiraoka

(10) Patent No.: US 12,736,990 B2
(45) Date of Patent: Sep. 15, 2026

(54) SEMICONDUCTOR DEVICE

(71) Applicant: ABLIC Inc., Nagano (JP)

(72) Inventor: Naohiro Hiraoka, Nagano (JP)

(73) Assignee: ABLIC Inc., Nagano (JP)

( * ) Notice: Subject to any disclaimer, the term of this patent is extended or adjusted under 35 U.S.C. 154(b) by 324 days.

(21) Appl. No.: 18/544,305

(22) Filed: Dec. 18, 2023

(65) Prior Publication Data

US 2024/0210974 A1 Jun. 27, 2024

(30) Foreign Application Priority Data

Dec. 26, 2022 (JP) ................................. 2022-208381

(51) Int. Cl.
*G05F 1/56* (2006.01)
*G05F 1/575* (2006.01)

(52) U.S. Cl.
CPC .............. *G05F 1/561* (2013.01); *G05F 1/575* (2013.01)

(58) Field of Classification Search
CPC ... G05F 3/30; G05F 3/267; G05F 3/26; G05F 3/262; G05F 3/24; G05F 3/242; G05F 3/16; G05F 3/22; G05F 1/463; G05F 1/465; G05F 1/468; G05F 1/561; G05F 1/10; G05F 1/56
See application file for complete search history.

(56) References Cited

U.S. PATENT DOCUMENTS

2008/0069176 A1 3/2008 Pertijs et al.
2010/0225332 A1* 9/2010 Niwa ................. H03K 17/9502 324/652
2021/0034091 A1* 2/2021 Chien ..................... G05F 1/468

FOREIGN PATENT DOCUMENTS

JP 2008513766 5/2008

* cited by examiner

*Primary Examiner* — Bryan R Perez
(74) *Attorney, Agent, or Firm* — JCIPRNET

(57) ABSTRACT

The semiconductor device includes a first current generation circuit configured to generate a first current, a second current generation circuit configured to generate a second current from the first current, a third current generation circuit configured to generate a third current from the second current, a voltage-current conversion circuit configured to apply the third current to a diode and convert a generated voltage into a fourth current, a fourth current generation circuit configured to generate a fifth current from the fourth current, and an arithmetic circuit configured to generate a temperature signal from the fifth current.

6 Claims, 7 Drawing Sheets

SEMICONDUCTOR DEVICE

CROSS-REFERENCE TO RELATED APPLICATION

This application claims the priority benefits of Japanese application no. 2022-208381, filed on Dec. 26, 2022. The entirety of the above-mentioned patent application is hereby incorporated by reference herein and made a part of this specification.

BACKGROUND

Technical Field

The present invention relates to a semiconductor device.

Description of Related Art

Digital temperature sensors are often used as built-in temperature sensors, for example, when used in desktop computers or server computers.

In the conventional semiconductor devices, techniques for trimming components which constitute a digital temperature sensor improve the accuracy of the temperature measured by the digital temperature sensor. When manufacturing a semiconductor device, it is preferable to obtain the intended measurement accuracy without applying trimming techniques to the components of the digital temperature sensor. In view of the above circumstances, the present invention provides a semiconductor device which improves the accuracy of the temperature measured, compared to conventional devices, without applying trimming techniques to the components.

SUMMARY

A semiconductor device according to at least one aspect of the present invention includes a first current generation circuit configured to generate a first current, a second current generation circuit configured to generate a second current from the first current, a third current generation circuit configured to generate a third current from the second current, a voltage-current conversion circuit configured to apply the third current to a diode and convert a generated voltage into a fourth current, a fourth current generation circuit configured to generate a fifth current from the fourth current, and an arithmetic circuit configured to generate a temperature signal from the fifth current.

The present invention provides a semiconductor device which is capable of reducing accuracy deteriorating factors affecting the accuracy of the temperature measured and obtaining a highly accurate temperature without applying trimming techniques.

DESCRIPTION OF THE EMBODIMENTS

The principle of improving the accuracy of the measured temperature according to the present invention will be described based on FIG. 10A to FIG. 10D.

Figure 10A:
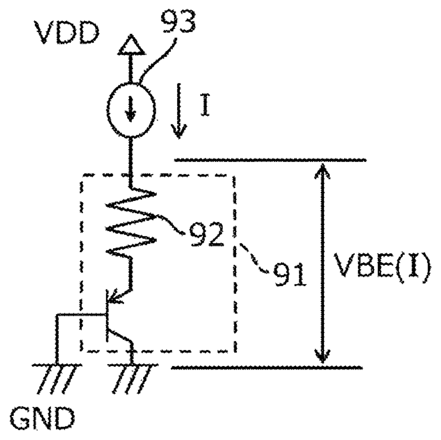
FIG. 10A to FIG. 10D are circuit diagrams for illustrating the principle of the present invention.

As illustrated in FIG. 10A, a diode-connected transistor 91 and a constant current circuit 93 are connected in series between a VDD terminal and a GND terminal. The diode-connected transistor 91 has a parasitic resistor 92 in series inside the transistor 91. A current I is applied to the diode-connected transistor 91, including the parasitic resistor 92 of the transistor 91, from the constant current circuit 93. At this time, the voltage generated between the base and emitter of the transistor 91 including the parasitic resistor 92 is defined as voltage VBE(I).

Figure 10B:
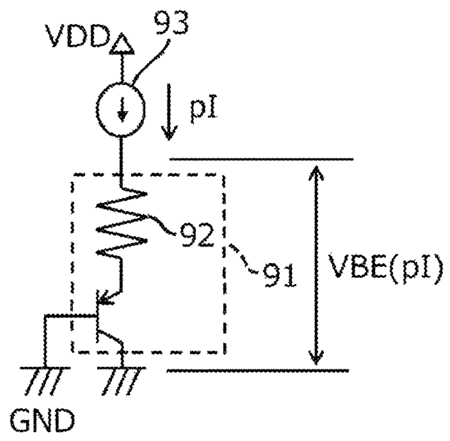

Similarly, as illustrated in FIG. 10B, a current pI is applied to the diode-connected transistor 91, including the parasitic resistor 92 of the transistor 91, from the constant current circuit 93. At this time, the voltage generated between the base and emitter of the transistor 91 including the parasitic resistor 92 is defined as voltage VBE(pI).

A difference voltage ΔVBE1 between the voltage VBE (pI) and the voltage VBE(I) is expressed by the following equation, where Rs is the resistance value of the parasitic resistor 92 of the transistor 91.

$$\begin{aligned}\Delta VBE1 &= VBE(pI) - VBE(I) \\ &= kT/q0 \cdot \ln(p) + (p-1) \cdot I \cdot Rs\end{aligned} \tag{1}$$

Here, k is a Boltzmann's constant [J/K], T is an absolute temperature [K], q0 is an elementary charge [C], and ln is a logarithm with Napier's number e as the base, a so-called natural logarithm.

Figure 10C:
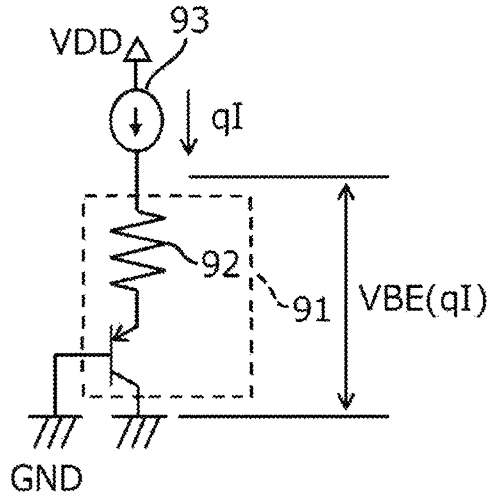
Figure 10D:
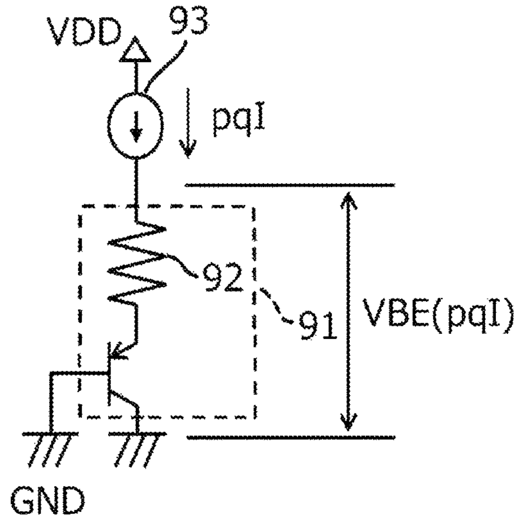

As illustrated in FIG. 10C, a current qI is applied to the diode-connected transistor 91, including the parasitic resistor 92 of the transistor 91, from the constant current circuit 93. At this time, the voltage generated between the base and emitter of the transistor 91 including the parasitic resistor 92 is defined as voltage VBE(qI). Similarly, as illustrated in FIG. 10D, a current pqI is applied to the diode-connected transistor 91, including the parasitic resistor 92 of the transistor 91, from the constant current circuit 93. At this time, the voltage generated between the base and emitter of the transistor 91 including the parasitic resistor 92 is defined as voltage VBE(pqI).

A difference voltage ΔVBE2 between the voltage VBE (pqI) and the voltage VBE(qI) is expressed by the following equation, where Rs is the resistance value of the parasitic resistor 92 of the transistor 91.

$$\Delta VBE2 = VBE(pIq) - VBE(qI) = kT/q0 \cdot \ln(p) + (p-1) \cdot q \cdot I \cdot Rs \quad (2)$$

Thus, the voltage ΔVBE with the term of the resistance value Rs of the parasitic resistor 92 eliminated may be obtained by multiplying the voltage ΔVBE1 by q and subtracting the voltage $$\Delta VBE2.$$

$$\Delta VBE = q \cdot \Delta VBE1 - \Delta VBE2 = kT/q0 \cdot (q-1) \cdot \ln(p) \quad (3)$$

The voltage ΔVBE which does not include the resistance value Rs of the parasitic resistor 92 may be obtained by applying the current I, the current pI, the current qI, and the current pqI to the transistor 91 including the parasitic resistor 92, and measuring the voltage between the base and emitter including the parasitic resistor 92, that is, the voltage VBE. The voltage ΔVBE is a voltage proportional to the absolute temperature T. By obtaining the voltage ΔVBE, the absolute temperature T which is not affected by the resistance value Rs is obtained.

First Embodiment

Figure 1:
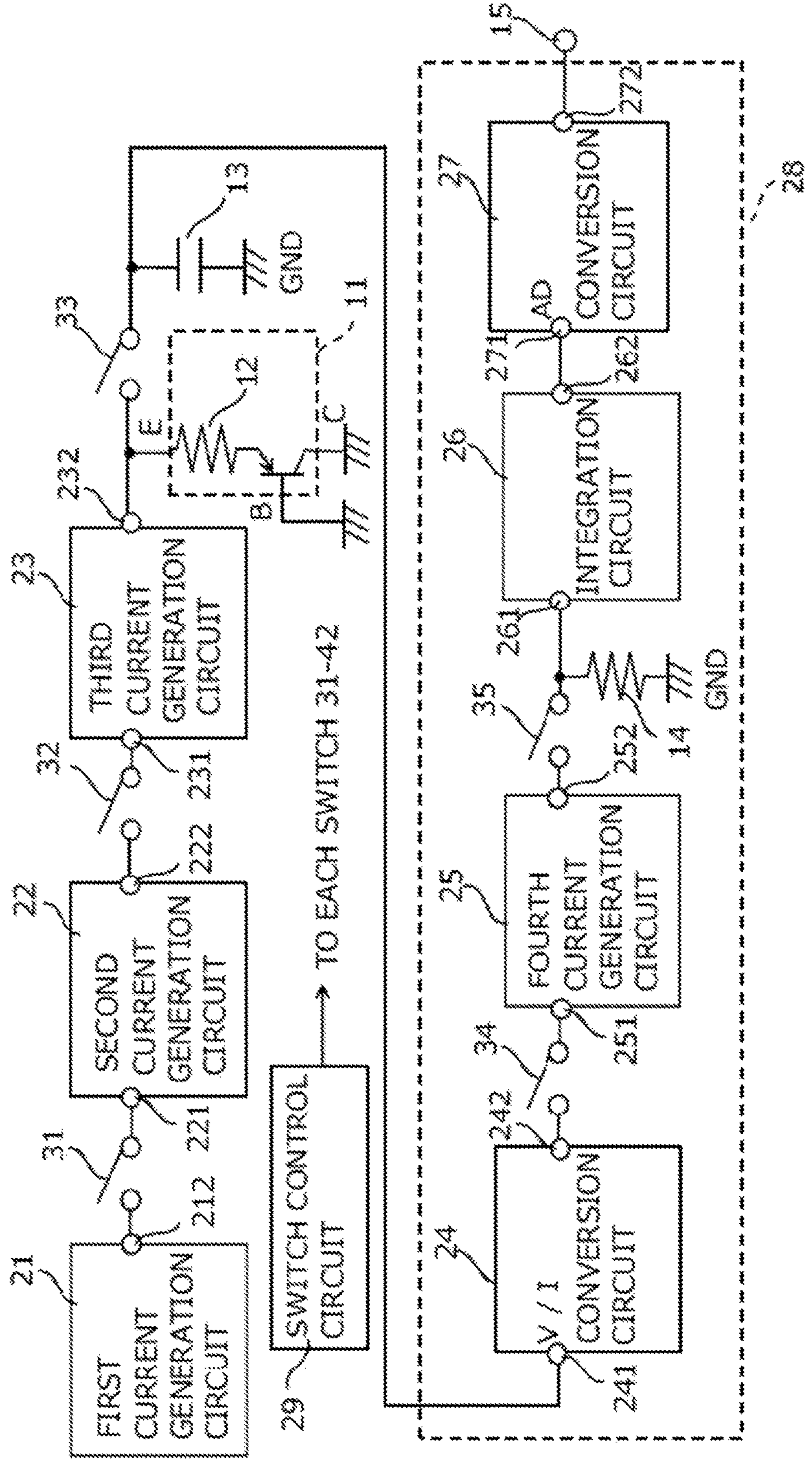
FIG. 1 is a block diagram illustrating an example of the semiconductor device according to the first embodiment of the present invention.

Hereinafter, the first embodiment of the present invention will be described with reference to the drawings. FIG. 1 is a block diagram illustrating an example of a semiconductor device according to this embodiment.

The semiconductor device according to this embodiment includes a first current generation circuit 21, a second current generation circuit 22, a third current generation circuit 23, a transistor 11, a first capacitor 13, a switch control circuit 29, a first switch 31, a second switch 32, a third switch 33, an arithmetic circuit 28, and an output port 15. The transistor 11 has the base B and collector C connected to the GND terminal, and is diode-connected. The diode-connected transistor 11 includes a parasitic resistor 12 and operates as a diode. The arithmetic circuit 28 includes a voltage-current conversion circuit 24, a fourth current generation circuit 25, a resistor 14, an integration circuit 26, an AD conversion circuit 27, a fourth switch 34, and a fifth switch 35.

The connection of the semiconductor device according to this embodiment will be described. An output port 212 of the first current generation circuit 21 is connected to an input port 221 of the second current generation circuit 22 via the first switch 31. An output port 222 of the second current generation circuit 22 is connected to an input port 231 of the third current generation circuit 23 via the second switch 32. An output port 232 of the third current generation circuit 23 is connected to the emitter E of the transistor 11, and is connected to a first terminal of the first capacitor 13 and an input port 241 of the voltage-current conversion circuit 24 via the third switch 33. An output port 242 of the voltage-current conversion circuit 24 is connected to an input port 251 of the fourth current generation circuit 25 via the fourth switch 34. An output port 252 of the fourth current generation circuit 25 is connected to a first terminal of the resistor 14 and an input port 261 of the integration circuit 26 via the fifth switch 35. An output port 262 of the integration circuit 26 is connected to an input port 271 of the AD conversion circuit 27. An output port 272 of the AD conversion circuit 27 is connected to the output port 15. The base B and collector C of the transistor 11, a second terminal of the first capacitor 13, and a second terminal of the resistor 14 are connected to the GND terminal. The switch control circuit 29 is connected to a control terminal of each switch.

Figure 2:
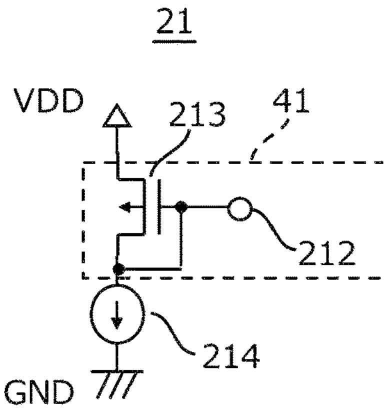
FIG. 2 is a circuit diagram illustrating an example of the first current generation circuit according to the first embodiment.

FIG. 2 is a circuit diagram illustrating an example of the first current generation circuit 21 according to this embodiment. The first current generation circuit 21 includes the output port 212, a first P-channel type MOS transistor (hereinafter referred to as PMOS transistor) 213, and a constant current source 214. The source of the first PMOS transistor 213 is connected to a VDD terminal. The drain and gate of the first PMOS transistor 213 are connected to each other, and are connected to the output port 212 and the GND terminal via the constant current source 214.

Figure 3:
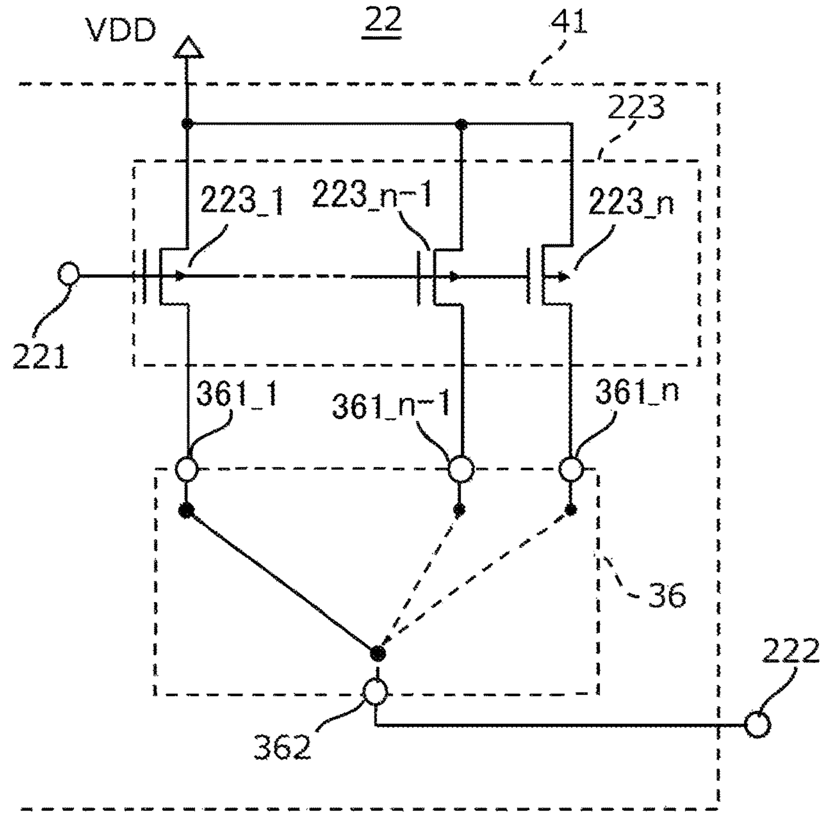
FIG. 3 is a circuit diagram illustrating an example of the second current generation circuit according to the first embodiment.

FIG. 3 is a circuit diagram illustrating an example of the second current generation circuit 22 according to this embodiment. The second current generation circuit 22 includes the input port 221, the output port 222, a first PMOS transistor array 223, and a switch 36. The first PMOS transistor array 223 includes n (n is plural) PMOS transistors 223_1 to 223_*n*, which are a PMOS transistor 223_1 to a PMOS transistor 223_*n*. The switch 36 includes n input ports 361_1 to 361_*n*, and an output port 362 selectively connected to any one of the input ports 361_1 to 361_*n*.

Each gate of the PMOS transistors 223_1 to 223_*n* of the first PMOS transistor array 223 is connected to the input port 221. Each source of the PMOS transistors 223_1 to 223_*n* is connected to the VDD terminal. The drains of the PMOS transistors 223_1 to 223_*n* are connected to the corresponding input ports 361_1 to 361_*n*, respectively. The output port 362 is connected to the output port 222. The first PMOS transistor array 223 and the first PMOS transistor 213 of the first current generation circuit 21 constitute a current mirror circuit 41.

Figure 4:
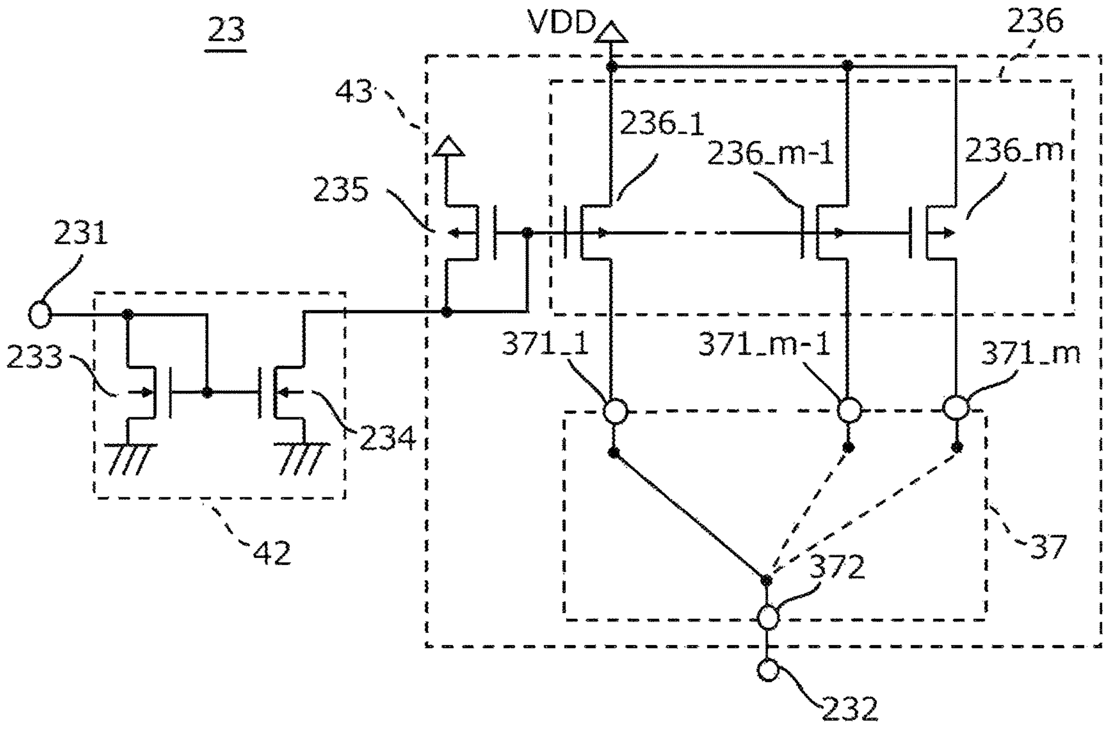
FIG. 4 is a circuit diagram illustrating an example of the third current generation circuit according to the first embodiment.

FIG. 4 is a circuit diagram illustrating an example of the third current generation circuit 23 according to this embodiment. The third current generation circuit 23 includes the input port 231, the output port 232, a first N-channel type MOS transistor (hereinafter referred to as NMOS transistor) 233, a second NMOS transistor 234, a second PMOS transistor 235, a second PMOS transistor array 236, and a switch 37. The second PMOS transistor array 236 includes m (m is plural) PMOS transistors 236_1 to 236_*m*, which are a PMOS transistor 236_1 to a PMOS transistor 236_*m*. The switch 37 includes m input ports 371_1 to 371_*m*, and an output port 372 selectively connected to any one of the input ports 371_1 to 371_*m*.

The input port 231 is connected to the drain and gate of the first NMOS transistor 233 and the gate of the second NMOS transistor 234. The source of the first NMOS transistor 233 and the source of the second NMOS transistor 234 are connected to the GND terminal. The source of the second PMOS transistor 235 is connected to the VDD terminal. The gates of the PMOS transistors 236_1 to 236_*m* of the second PMOS transistor array 236 are connected to the gate and drain of the second PMOS transistor 235 and the drain of the second NMOS transistor 234. The sources of the PMOS transistors 236_1 to 236_*m* are connected to the VDD terminal. The drains of the PMOS transistors 236_1 to **236_*m* are connected to the corresponding input ports 371_1 to 371_*m* of the switch 37, respectively. The output port 372 of the switch 37 is connected to the output port 232. The first NMOS transistor 233 and the second NMOS transistor 234 constitute a current mirror circuit 42. The second PMOS transistor 235 and the second PMOS transistor array 236 constitute a current mirror circuit 43**.

Figure 5:
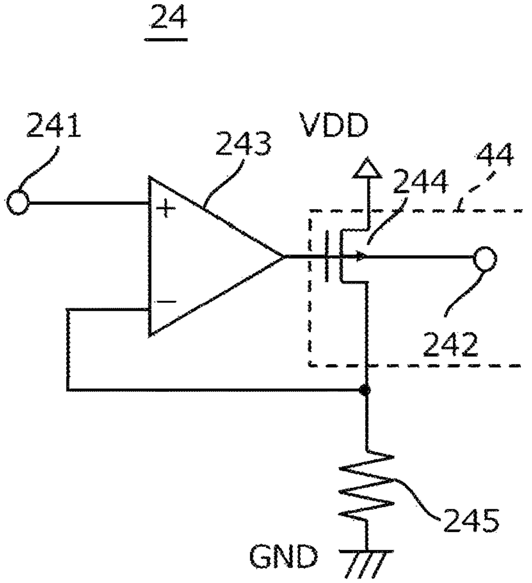
FIG. 5 is a circuit diagram illustrating an example of the voltage-current conversion circuit according to the first embodiment.

FIG. 5 is a circuit diagram illustrating an example of the voltage-current conversion circuit 24 according to this embodiment. The voltage-current conversion circuit 24 includes the input port 241, the output port 242, an operational amplifier 243, a third PMOS transistor 244, and a resistor 245. The input port 241 is connected to the non-inverting input port of the operational amplifier 243. The output port of the operational amplifier 243 is connected to the gate of the third PMOS transistor 244 and the output port 242. The source of the third PMOS transistor 244 is connected to the VDD terminal. The drain of the third PMOS transistor 244 is connected to the inverting input port of the operational amplifier 243 and the first terminal of the resistor 245. The second terminal of the resistor 245 is connected to the GND terminal. The resistance value of the resistor 245 is set to the same resistance value as the resistance value of the resistor 14.

Figure 6:
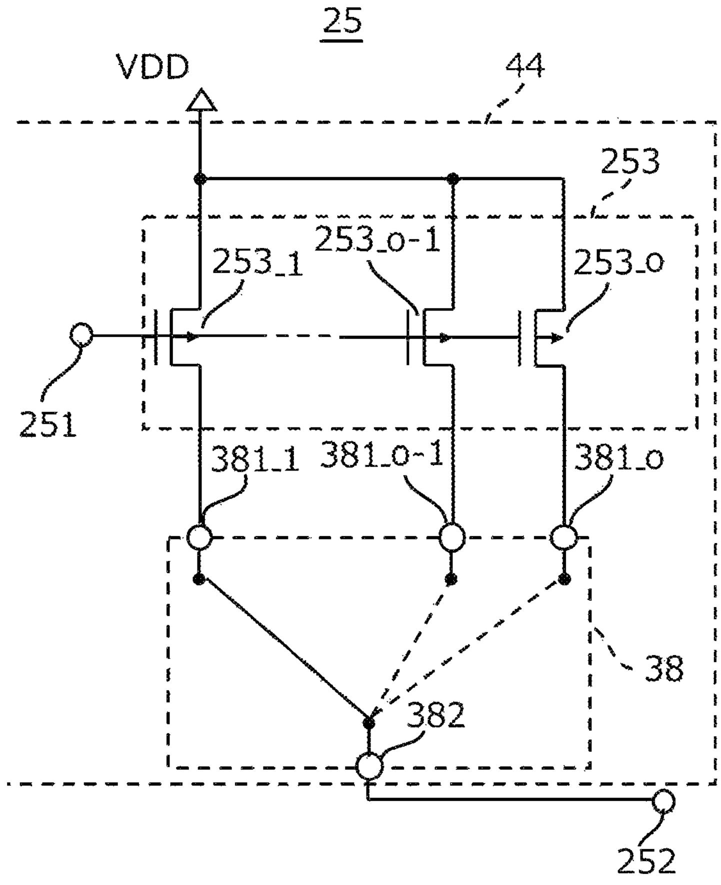
FIG. 6 is a circuit diagram illustrating an example of the fourth current generation circuit according to the first embodiment.

FIG. 6 is a circuit diagram illustrating an example of the fourth current generation circuit 25 according to this embodiment. The fourth current generation circuit 25 includes the input port 251, the output port 252, a third PMOS transistor array 253, and a switch 38. The third PMOS transistor array 253 includes o (o is plural) PMOS transistors 253_1 to **253_*o*, which are a PMOS transistor 253_1 to a PMOS transistor 253_*o*. The switch 38 includes o input ports 381_1 to 381_*o*, and an output port 382 selectively connected to any one of the input ports 381_1 to 381_*o*. Each gate of the PMOS transistors 253_1 to 253_*o* of the third PMOS transistor array 253 is connected to the input port 251. Each source of the PMOS transistors 253_1 to 253_*o* is connected to the VDD terminal. The drains of the PMOS transistors 253_1 to 253_*o* are connected to the corresponding input ports 381_1 to 381_*o*, respectively. The output port 382 is connected to the output port 252. The third PMOS transistor 244 and the third PMOS transistor array 253 constitute a current mirror circuit 44**.

Figure 7:
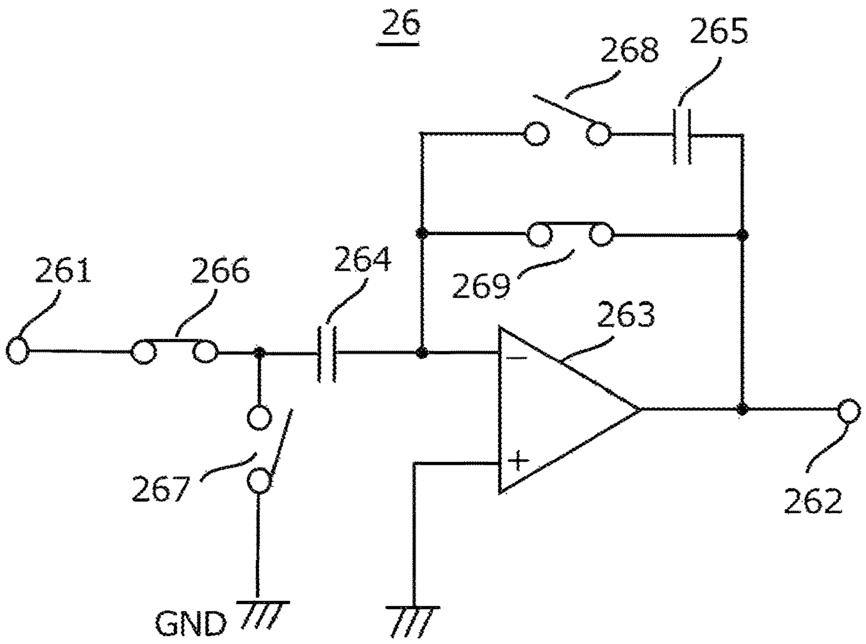
FIG. 7 is a circuit diagram illustrating an example of the integration circuit according to the first embodiment.

FIG. 7 is a circuit diagram illustrating an example of the integration circuit 26 according to this embodiment. The integration circuit 26 includes the input port 261, the output port 262, a second operational amplifier 263, a second capacitor 264, a third capacitor 265, and switches 266 to 269. The input port 261 is connected to the first terminal of the switch 266. The second terminal of the switch 266 is connected to the first terminal of the second capacitor 264 and the first terminal of the switch 267. The second terminal of the second capacitor 264 is connected to the inverting input port of the second operational amplifier 263, the first terminal of the switch 268, and the first terminal of the switch 269. The second terminal of the switch 268 is connected to the first terminal of the third capacitor 265. The output port of the second operational amplifier 263 is connected to the second terminal of the third capacitor 265, the second terminal of the switch 269, and the output port 262. The second terminal of the switch 267 and the non-inverting input port of the second operational amplifier 263 are connected to the GND terminal.

Figure 8:
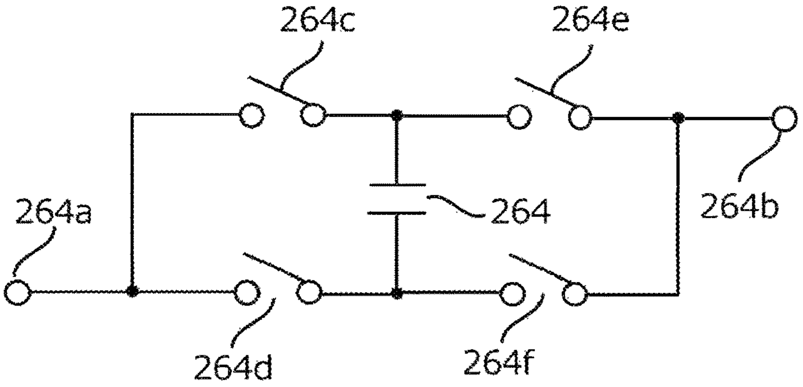
FIG. 8 is a circuit diagram illustrating an example of the configuration of the second capacitor according to the first embodiment.

Here, the second capacitor 264 may be configured to be connected between a first terminal **264*a* and a second terminal 264*b* via a switch, as illustrated in FIG. 8. Specifically, the first terminal 264*a* is connected to the first terminal of a switch 264*c* and the first terminal of a switch 264*d*. The second terminal of the switch 264*c* is connected to the first terminal of the second capacitor 264 and the first terminal of a switch 264*e*. The second terminal of the switch 264*d* is connected to the second terminal of the second capacitor 264 and the first terminal of a switch 264*f*. The second terminal of the switch 264*e* and the second terminal of the switch 264*f* are connected to the second terminal 264*b*. With such a configuration, the second capacitor 264 is switched between adding and subtracting charges by switching the switch. The third capacitor 265** may also have a similar configuration.

The AD conversion circuit 27 converts the output signal of the integration circuit 26 input from the input port 271 from analog to digital, and outputs a signal regarding temperature from the output port 15 as a digital signal. Since the AD conversion circuit is a general circuit, the description thereof will be omitted.

An operation of the semiconductor device of this embodiment, which is a temperature measurement technique for obtaining a temperature signal with higher accuracy than the conventional techniques, will be described. The semiconductor device of this embodiment applies the four types of currents illustrated in FIG. 10A to FIG. 10D to the transistor 11, and obtains a highly accurate temperature signal as a digital signal from the voltage VBE at the time when the respective currents are applied.

<Operation in the First Stage>

An outline of the operation in the first stage will be described. In the first stage, a current I is applied to the diode-connected transistor 11. The voltage between the base and emitter of the transistor 11, that is, voltage VBE(I), is held in the first capacitor 13, which is a sampling capacitor.

The specific operation in the first stage will be described. According to a control signal from the switch control circuit 29, the switches 31 to 33 and the switch 269 are turned on, and the switches 34 and 35 and the switches 266 to 268 are turned off. The constant current source 214 of the first current generation circuit 21 generates the current I. Since the switch 31 is on, the first PMOS transistor 213 and the first PMOS transistor array 223 form the current mirror circuit 41. The switch 36 is controlled by the control signal from the switch control circuit 29 so that the current mirror ratio of the current mirror circuit 41 is 1:1. The output port 222 of the second current generation circuit 22 outputs the current I to the third current generation circuit 23.

The current mirror circuit 42 of the third current generation circuit 23 has the current mirror ratio set to 1:1, and outputs the current I to the current mirror circuit 43. The switch 37 of the third current generation circuit 23 is controlled by the control signal from the switch control circuit 29 so that the current mirror ratio of the current mirror circuit 43 is 1:1. The output port 232 of the third current generation circuit 23 outputs the current I to the diode-connected transistor 11. The voltage VBE(I) of the transistor 11 at the time when the current I is applied is held in the first capacitor 13, which is a sampling capacitor, via the switch 33.

<Operation in the Second Stage>

An outline of the operation in the second stage will be described. In the second stage, the arithmetic circuit 28 receives the voltage VBE(I) held in the first capacitor 13, which is a sampling capacitor. The voltage-current conversion circuit 24 of the arithmetic circuit 28 converts the voltage VBE(I) into a current value, and the current value is multiplied by q by the fourth current generation circuit 25 and is added to the resistor 14. The integration circuit 26 receives the voltage generated across the resistor 14, which is held in the second capacitor 264.

The specific operation in the second stage will be described. According to the control signal from the switch control circuit 29, the switches 31 to 33 and the switches 267 and 268 are turned off, and the switch 34, the switch 35, the switch 266, and the switch 269 are turned on. The non-inverting input port of the operational amplifier 243 receives the voltage VBE(I) held in the first capacitor 13 via the input port 241 of the voltage-current conversion circuit 24. The drain of the third PMOS transistor 244 connected to the output port of the operational amplifier 243 is connected to the inverting input port of the operational amplifier 243. The voltage VBE(I) is applied to the first terminal of the resistor 245 from the drain of the third PMOS transistor 244. A current Ia determined by the voltage VBE(I) and the resistance value of the resistor 245 flows through the resistor 245. A voltage VBE(Ia) is generated across the resistor 245. The switch 38 of the fourth current generation circuit 25 is controlled by the control signal from the switch control circuit 29 so that the current mirror circuit 44 operates at a current mirror ratio of 1:q. The resistance value of the resistor 14 is set to the same resistance value as the resistance value of the resistor 245. The current Ia multiplied by q flows through the resistor 14. A voltage q times the voltage VBE(Ia) is generated across the resistor 14.

The voltage VBE(Ia) multiplied by q, which is the voltage across the resistor 14, is applied to the input port 261 of the integration circuit 26. The input voltage VBE(Ia) multiplied by q is held in the second capacitor 264 because the switch 266 and the switch 269 are turned on.

<Operation in the Third Stage>

An outline of the operation in the third stage will be described. In the third stage, a current I multiplied by p is applied to the diode-connected transistor 11. The voltage VBE(pI) of the transistor 11 is held in the first capacitor 13, which is a sampling capacitor.

The specific operation in the third stage will be described. According to the control signal from the switch control circuit 29, the switches 31 to 33 and the switch 269 are turned on, and the switches 34 and 35 and the switches 266 to 268 are turned off. The constant current source 214 of the first current generation circuit 21 generates the current I. Since the switch 31 is on, the first PMOS transistor 213 and the first PMOS transistor array 223 form the current mirror circuit 41. The switch 36 is controlled by the control signal from the switch control circuit 29 so that the current mirror ratio of the current mirror circuit 41 is 1:1. The output port 222 of the second current generation circuit 22 outputs the current I to the third current generation circuit 23.

The current mirror circuit 42 of the third current generation circuit 23 has the current mirror ratio set to 1:1, and outputs the current I to the current mirror circuit 43. The switch 37 of the third current generation circuit 23 is controlled by the control signal from the switch control circuit 29 so that the current mirror ratio of the current mirror circuit 43 is 1:p. The output port 232 of the third current generation circuit 23 outputs the current I multiplied by p to the diode-connected transistor 11. The voltage VBE(pI) of the transistor 11 at the time when the current I multiplied by p is applied is held in the first capacitor 13, which is a sampling capacitor, via the switch 33.

<Operation in the Fourth Stage>

An outline of the operation in the fourth stage will be described. In the fourth stage, the arithmetic circuit 28 receives the voltage VBE(pI) held in the first capacitor 13, which is a sampling capacitor. The voltage-current conversion circuit 24 of the arithmetic circuit 28 converts the voltage VBE(pI) into a current value, and the current value is multiplied by q by the fourth current generation circuit 25 and is added to the resistor 14. The integration circuit 26 receives the voltage generated across the resistor 14, which is added to or subtracted from the voltage held in the second capacitor 264, and is held in the third capacitor 265.

The specific operation in the fourth stage will be described. According to the control signal from the switch control circuit 29, the switches 31 to 33, the switch 267, and the switch 269 are turned off, and the switches 34 and 35, the switch 266, and the switch 268 are turned on. The non-inverting input port of the operational amplifier 243 receives the voltage VBE(pI) held in the first capacitor 13 via the input port 241 of the voltage-current conversion circuit 24. The drain of the third PMOS transistor 244 connected to the output port of the operational amplifier 243 is connected to the inverting input port of the operational amplifier 243. The voltage VBE(pI) is applied to the first terminal of the resistor 245 from the drain of the third PMOS transistor 244. A current pIa determined by the voltage VBE(pI) and the resistance value of the resistor 245 flows through the resistor 245. A voltage VBE(pIa) is generated across the resistor 245. The switch 38 of the fourth current generation circuit 25 is controlled by the control signal from the switch control circuit 29 so that the current mirror circuit 44 operates at a current mirror ratio of 1:q. The resistance value of the resistor 14 is set to the same resistance value as the resistance value of the resistor 245. The current pIa multiplied by q flows through the resistor 14. A voltage q times the voltage VBE(pIa) is generated across the resistor 14.

The voltage VBE(pIa) multiplied by q, which is the voltage across the resistor 14, is applied to the input port 261 of the integration circuit 26. Since the switch 266 and the switch 268 are on, the input voltage VBE(pIa) multiplied by q is held in the third capacitor 265 after subtracting the voltage VBE(Ia) multiplied by q and held in the second capacitor 264. Here, the voltage held in the third capacitor 265 corresponds to a voltage $q\cdot\Delta VBE1$ obtained by multiplying the voltage $\Delta VBE1$ illustrated in equation (1) by q.

<Operation in the Fifth Stage>

An outline of the operation in the fifth stage will be described. In the fifth stage, a current I multiplied by pq is applied to the diode-connected transistor 11. The voltage VBE(pqI) of the transistor 11 is held in the first capacitor 13, which is a sampling capacitor.

The specific operation in the fifth stage will be described. According to the control signal from the switch control circuit 29, the switches 31 to 33 and the switch 269 are turned on, and the switches 34 and 35 and the switches 266 to 268 are turned off. The constant current source 214 of the first current generation circuit 21 generates the current I. Since the switch 31 is on, the first PMOS transistor 213 and the first PMOS transistor array 223 form the current mirror circuit 41. The switch 36 is controlled by the control signal from the switch control circuit 29 so that the current mirror ratio of the current mirror circuit 41 is 1:q. The output port 222 of the second current generation circuit 22 outputs the current I multiplied by q to the third current generation circuit 23.

The current mirror circuit 42 of the third current generation circuit 23 has the current mirror ratio set to 1:1, and outputs the current I multiplied by q to the current mirror circuit 43. The switch 37 of the third current generation circuit 23 is controlled by the control signal from the switch control circuit 29 so that the current mirror ratio of the current mirror circuit 43 is 1:p. The output port 232 of the third current generation circuit 23 outputs the current I multiplied by pq to the diode-connected transistor 11. The voltage VBE(pqI) of the transistor 11 at the time when the current I multiplied by pq is applied is held in the first capacitor 13, which is a sampling capacitor, via the switch 33.

<Operation in the Sixth Stage>

An outline of the operation in the sixth stage will be described. In the sixth stage, the arithmetic circuit 28 receives the voltage VBE(pqI) held in the first capacitor 13, which is a sampling capacitor. The voltage-current conversion circuit 24 of the arithmetic circuit 28 converts the voltage VBE(pqI) into a current value, and the current value is multiplied by 1 by the fourth current generation circuit 25 and is added to the resistor 14. The integration circuit 26 receives the voltage generated across the resistor 14, which is held in the second capacitor 264.

The specific operation in the sixth stage will be described. According to the control signal from the switch control circuit 29, the switches 31 to 33, the switch 267, and the switch 268 are turned off, and the switches 34 and 35, the switch 266, and the switch 269 are turned on. The non-inverting input port of the operational amplifier 243 receives the voltage VBE(pqI) held in the first capacitor 13 via the input port 241 of the voltage-current conversion circuit 24. The drain of the third PMOS transistor 244 connected to the output port of the operational amplifier 243 is connected to the inverting input port of the operational amplifier 243. The voltage VBE(pqI) is applied to the first terminal of the resistor 245 from the drain of the third PMOS transistor 244. A current pqIa determined by the voltage VBE(pqI) and the resistance value of the resistor 245 flows through the resistor 245. A voltage VBE(pqIa) is generated across the resistor 245. The switch 38 of the fourth current generation circuit 25 is controlled by the control signal from the switch control circuit 29 so that the current mirror circuit 44 operates at a current mirror ratio of 1:1. The resistance value of the resistor 14 is set to the same resistance value as the resistance value of the resistor 245. The current pqIa flows through the resistor 14. The voltage (pqIa) is generated across the resistor 14.

The voltage VBE(pqIa), which is the voltage across the resistor 14, is applied to the input port 261 of the integration circuit 26. The input voltage VBE(pqIa) is held in the second capacitor 264 because the switch 266 and the switch 269 are turned on.

<Operation in the Seventh Stage>

An outline of the operation in the seventh stage will be described. In the seventh stage, a current I multiplied by q is applied to the diode-connected transistor 11. The voltage VBE(qI) of the transistor 11 is held in the first capacitor 13, which is a sampling capacitor.

The specific operation in the seventh stage will be described. According to the control signal from the switch control circuit 29, the switches 31 to 33 are turned on, and the switches 34 and 35 are turned off. The constant current source 214 of the first current generation circuit 21 generates the current I. Since the switch 31 is on, the first PMOS transistor 213 and the first PMOS transistor array 223 form the current mirror circuit 41. The switch 36 is controlled by the control signal from the switch control circuit 29 so that the current mirror ratio of the current mirror circuit 41 is 1:q. The output port 222 of the second current generation circuit 22 outputs the current I multiplied by q to the third current generation circuit 23.

The current mirror circuit 42 of the third current generation circuit 23 has the current mirror ratio set to 1:1, and outputs the current I multiplied by q to the current mirror circuit 43. The switch 37 of the third current generation circuit 23 is controlled by the control signal from the switch control circuit 29 so that the current mirror ratio of the current mirror circuit 43 is 1:1. The output port 232 of the third current generation circuit 23 outputs the current I multiplied by q to the diode-connected transistor 11. The voltage VBE(qI) of the transistor 11 at the time when the current I multiplied by q is applied is held in the first capacitor 13, which is a sampling capacitor, via the switch 33.

<Operation in the Eighth Stage>

An outline of the operation in the eighth stage will be described. In the eighth stage, the arithmetic circuit 28 receives the voltage VBE(qI) held in the first capacitor 13, which is a sampling capacitor. The voltage-current conversion circuit 24 of the arithmetic circuit 28 converts the voltage VBE(qI) into a current value, and the current value is multiplied by 1 by the fourth current generation circuit 25 and is added to the resistor 14. The integration circuit 26 receives the voltage generated across the resistor 14, which is added to or subtracted from the voltage held in the second capacitor 264, and is added to or subtracted from the voltage already held in the third capacitor 265 in the fourth stage, and is held in the third capacitor 265.

The specific operation in the eighth stage will be described. According to the control signal from the switch control circuit 29, the switches 31 to 33, the switch 267, and the switch 269 are turned off, and the switches 34 and 35, the switch 266, and the switch 268 are turned on. The non-inverting input port of the operational amplifier 243 receives the voltage VBE(qI) held in the first capacitor 13 via the input port 241 of the voltage-current conversion circuit 24. The drain of the third PMOS transistor 244 connected to the output port of the operational amplifier 243 is connected to the inverting input port of the operational amplifier 243. The voltage VBE(qI) is applied to the first terminal of the resistor 245 from the drain of the third PMOS transistor 244. A current qIa determined by the voltage VBE(qI) and the resistance value of the resistor 245 flows through the resistor 245. A voltage VBE(qIa) is generated across the resistor 245. The switch 38 of the fourth current generation circuit 25 is controlled by the control signal from the switch control circuit 29 so that the current mirror circuit 44 operates at a current mirror ratio of 1:1. The resistance value of the resistor 14 is set to the same resistance value as the resistance value of the resistor 245. The current qIa flows through the resistor 14. The voltage VBE(qIa) is generated across the resistor 14.

The voltage VBE(qIa), which is the voltage across the resistor 14, is applied to the input port 261 of the integration circuit 26. Since the switch 266 and the switch 268 are turned on, the input voltage VBE(qIa) is applied to the third capacitor 265 after subtracting the voltage VBE(qpIa) held in the second capacitor 264. Here, the voltage applied from the second capacitor 264 to the third capacitor 265 corresponds to the voltage ΔVBE2 illustrated in equation (2). The third capacitor 265 holds a voltage corresponding to the voltage q. ΔVBE1 in the fourth stage. With the voltage ΔVBE2 subtracted, the voltage held in the third capacitor 265 corresponds to the voltage ΔVBE illustrated in equation (3). The voltage ΔVBE is proportional to the absolute temperature T, as illustrated in equation (3), and the influence of the parasitic resistor 12 is removed. The input port 271 of the AD conversion circuit 27 receives the voltage ΔVBE from the output port 262 of the integration circuit 26. The AD conversion circuit 27 outputs a digital signal regarding temperature, with the influence of the parasitic resistor 12 removed from the input voltage VBE, from the output port 15 via the output port 272.

After the operation in the eighth stage is completed, the semiconductor device of this embodiment repeats the operations from the first stage. The first to third capacitors are initialized in a timely manner. The operations from the first stage to the eighth stage are performed by a switch control signal from the switch control circuit 29.

The semiconductor device of this embodiment outputs from the output port 15 a digital signal regarding temperature, which has the influence of the parasitic resistor 12 removed from the voltage between the base and emitter of the diode-connected transistor 11 without using trimming techniques and improves the accuracy of the measured temperature derived therefrom.

Although this embodiment uses a current mirror circuit as the current generation circuit, any circuit which outputs a current with a variable magnification with respect to a reference current may be used, such as a circuit using an operational amplifier or the like. Although a diode-connected transistor is used as the diode for detecting temperature, since a PN connection voltage is used, any semiconductor with a PN connection, such as a diode, may be used.

Second Embodiment

Figure 9:
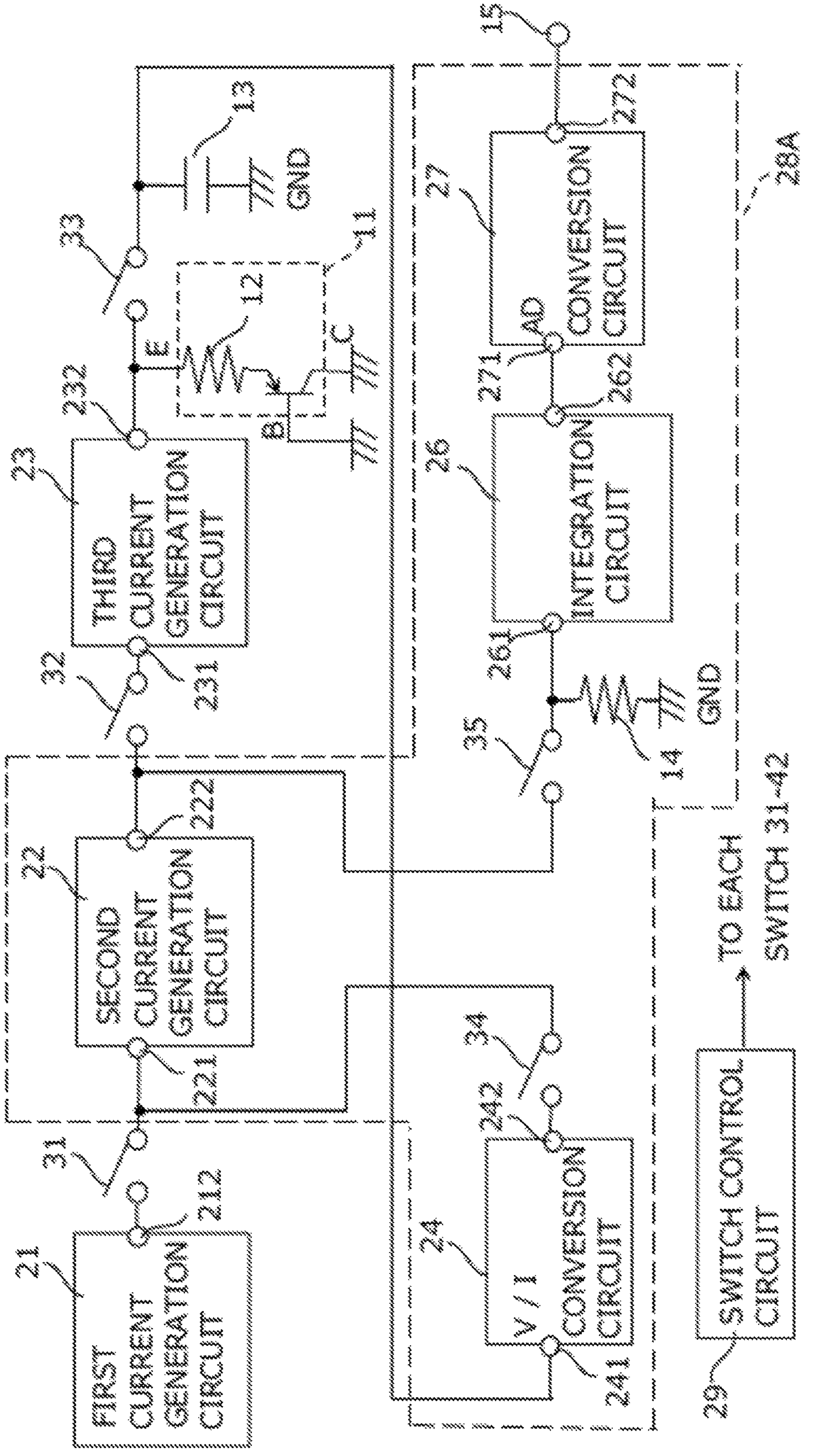
FIG. 9 is a block diagram illustrating an example of the semiconductor device according to the second embodiment of the present invention.

Hereinafter, the second embodiment of the present invention will be described with reference to the drawings. FIG. 9 is a block diagram illustrating an example of the semiconductor device according to this embodiment.

The semiconductor device according to this embodiment includes a first current generation circuit 21, a third current generation circuit 23, a transistor 11, a first capacitor 13, a first switch 31, a second switch 32, a third switch 33, an arithmetic circuit 28*a*, a switch control circuit 29, and an output port 15. The arithmetic circuit 28*a* includes a voltage-current conversion circuit 24, a second current generation circuit 22, a resistor 14, an integration circuit 26, an AD conversion circuit 27, a fourth switch 34, and a fifth switch 35. The diode-connected transistor 11 includes a parasitic resistor 12. The difference between this embodiment and the first embodiment is that the second current generation circuit 22 and the fourth current generation circuit of the first embodiment are configured by the same circuit. The other configurations are the same as the first embodiment.

The switch 31 and the switch 34 perform complementary on/off operations in the first stage to the eighth stage. Similarly, the switch 32 and the switch 35 perform complementary on/off operations in the first stage to the eighth stage. The second current generation circuit 22 and the fourth current generation circuit of the first embodiment may have the same circuit configuration. By configuring the second current generation circuit 22 and the fourth current generation circuit of the first embodiment with the same circuit, the semiconductor device of this embodiment is capable of reducing errors due to circuit variations between the second current generation circuit and the fourth current generation circuit.

As described above, the semiconductor device according to the present invention is capable of obtaining a highly accurate temperature signal as a digital signal without using trimming techniques. Although the arithmetic circuit of each embodiment has been described as having a configuration including an AD conversion circuit, the arithmetic circuit may have a configuration of an arithmetic circuit which outputs an analog signal. These embodiments and modifications thereof are included within the scope and gist of the present invention.

What is claimed is:

1. A semiconductor device, comprising:

a first current generation circuit configured to generate a first current;

a second current generation circuit configured to generate a second current from the first current;

a third current generation circuit configured to generate a third current from the second current;

a voltage-current conversion circuit configured to apply the third current to a diode and convert a generated voltage into a fourth current;

a fourth current generation circuit configured to generate a fifth current from the fourth current; and an arithmetic circuit configured to generate a temperature signal from the fifth current.

2. The semiconductor device according to claim 1, wherein the second current generation circuit, the third current generation circuit, and the fourth current generation circuit are current generation circuits configured to generate a current with a variable magnification with respect to an input current, and the semiconductor device further includes a switch control circuit configured to control the current with the variable magnification generated by the second current generation circuit, the third current generation circuit, and the fourth current generation circuit through a control signal.

3. The semiconductor device according to claim 1, wherein the second current generation circuit, the third current generation circuit, and the fourth current generation circuit are current mirror circuits.

4. The semiconductor device according to claim 2, wherein the second current generation circuit, the third current generation circuit, and the fourth current generation circuit are current mirror circuits.

5. The semiconductor device according to claim 1, wherein the diode is a diode-connected transistor.

6. The semiconductor device according to claim 1, wherein the temperature signal is a digital signal.

* * * * *